United States Patent Office 2,954,381
Patented Sept. 27, 1960

2,954,381

HETEROARYLOXAZOLIDINEDIONES

Seymour L. Shapiro, Hastings on Hudson, and Louis Freedman, Bronxville, N.Y., assignors to U.S. Vitamin & Pharmaceutical Corporation, a corporation of Delaware No Drawing. Filed Dec. 3, 1958, Ser. No. 777,856

6 Claims. (Cl. 260—287)

This invention relates to 3-substituted oxazolidinediones which have an N-heteroaryl ring directly attached to, and separated by, one methylene group from the nitrogen of the oxazolidinedione ring, and to a process for making these compounds. More particularly, the invention is concerned with oxazolidinediones of the following formula

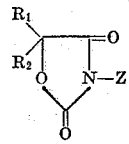

wherein $R_1$ and $R_2$ are hydrogen and lower alkyl, and Z is a substituent bearing an N-heteroaryl ring attached directly or through a methylene group to the oxazolidinedione ring nitrogen, and consists of such groups as pyridyl, picolyl, pyrimidyl and quinolyl, and the corresponding methyl derivatives of these ring systems.

In the practice of the invention, the heteroarylamine or heteroaralkylamine is treated with the α-hydroxy ester and a lower dialkyl carbonate in the presence of a basic catalyst and the mixture heated at reflux for a suitable reaction period. On standing, the formed product either precipitates out of the reaction mixture, or may be separated by fractional distillation.

The following equation indicates a typical reaction:

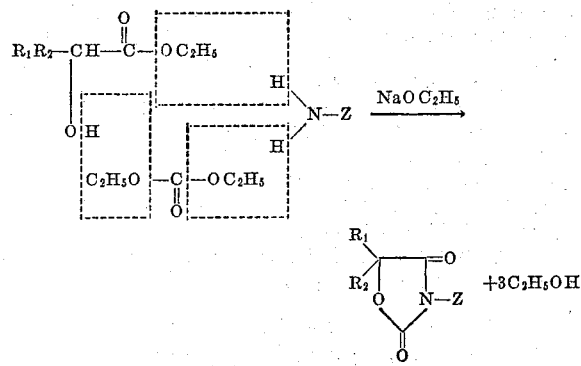

The basic catalyst can be varied as alkali metal alkoxide, such as sodium methoxide, lithium ethoxide, sodium ethoxide, potassium propoxide, or benzyl-trimethyl ammonium methoxide, although the convenient and economical reactants, sodium methoxide or sodium ethoxide are to be preferred.

Similarly, the selection of the alkyl carbonate is indicated by reasons of economy as diethyl carbonate, although any of the $C_1$–$C_5$ alkyl carbonates are satisfactory.

The selection of the $R_1R_2CH(OH)COOC_2H_5$ and Z—$NH_2$ determines the formed product, and typical compounds prepared and the properties of such products are given in Table I.

Since the products of this invention are bases, it is desirable to convert the bases to water-soluble acid addition salts with the mineral acids. These bases are readily converted to the acid addition salts by direct interaction of the base with the acid in the presence of a solvent. Moreover, the acid addition salts are preferably those whose anions are relatively innocuous.

The bases can also be converted to quaternary ammonium salts derived from the lower alkyl esters of strong inorganic acids, e.g., methyl halides, methyl sulfate, methyl tosylate, ethyl halides and the like.

TABLE I

*Oxazolidinediones*

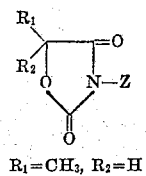

$R_1 = CH_3$, $R_2 = H$

| Z | M.p., °C. | B.p., °C. | mm. Pressure |
|---|---|---|---|
| 2-pyridyl | | 134 | 0.2 |
| 3-pyridyl | 119–120 | | |
| 3-pyridyl-CH₃I | 164–166 | | |
| 3-CH₃-(2-pyridyl) | | 126–130 | 0.2 |
| 4-CH₃-(2-pyridyl) | 88–89 | | |
| 6-CH₃-(2-pyridyl) | 95–96 | | |
| 2-picolyl | | 104–108 | 0.02 |
| 2-picolyl.CH₃I | 178–180 | | |
| 3-picolyl | | 125–128 | 0.12 |
| 3-picolyl.CH₃I | 151–153 | | |
| 4-picolyl | 112–113 | | |
| 4-picolyl.CH₃I | 168–171 | | |

$R_1 = CH_3$, $R_2 = CH_3$

| Z | M.p., °C. | B.p., °C. | mm. Pressure |
|---|---|---|---|
| 2-pyridyl | 118–119 | | |
| 2-pyridyl.CH₃I | 163–164 | | |
| 3-pyridyl | 147–148 | | |
| 3-pyridyl.CH₃I | 201–202 | | |
| 4-pyridyl | 133–134 | | |
| 4-pyridyl.CH₃I | 241–244 | | |
| 4-CH₃-(2-pyridyl) | 178–179 | | |
| 2-picolyl | 59–60 | | |
| 3-picolyl | | 117–120 | 0.05 |
| 4-picolyl | 94–95 | | |
| 3-quinolyl | 164–166 | | |
| 3-quinolyl.CH₃I | 217–218 | | |
| 2,6-di CH₃-(4-pyrimidyl) | 94–95 | | |

As an illustrative embodiment of the manner in which the invention may be practiced, the following examples are presented which, however, are not to be construed as limiting.

EXAMPLE 1.—3-(4-PYRIDYL)-5,5-DIMETHYL-1,3-OXAZOLIDINEDIONE

A solution of 0.2 g. of sodium metal in 4 ml. of ethanol was added to a solution of 9.4 g. (0.10 mole) of 4-aminopyridine, 14.5 g. (0.11 mole) of ethyl α-hydroxy-iso-butyrate and 37 ml. of diethyl carbonate, and the reaction mixture heated under reflux. After 30 minutes the initial internal temperature had dropped from 136° to 105° C. The formed ethanol, 22 ml. (100%), was removed by distillation. The reaction mixture was filtered and upon standing, 13.3 g. (65%) of product separated, M.P. 131–133° C. Recrystallization (hexane-ethyl acetate) raised the melting point to 133–134° C.

*Analysis.*—Calcd. for $C_{10}H_{10}N_2O_3$: C, 58.3; H, 4.9; N, 13.6. Found: C, 58.3; H, 5.0; N, 13.9.

The methiodide was prepared by reacting 2.0 g. (0.01 mole) of the above with 2 ml. of methyl iodide in 40 ml. of ethanol at 20° C. for one week. There was obtained 3.0 g. (93%), M.P. 241–244° C.

*Analysis.*—Calcd. for $C_{11}H_{13}IN_2O_3$: C, 37.9; H, 3.8; N, 8.0. Found: C, 38.2; H, 3.9; N, 8.4.

A solution of 3-(4-pyridyl)-5,5-dimethyl-1,3-oxazolidine-2,4-dione in ethanol, upon treatment with one equivalent of ethanolic hydrogen chloride, after evaporation, yields the hydrochloride of the compound.

EXAMPLE 2.—3-(3-QUINOLYL)-5,5-DIMETHYL-1,3-OXAZOLIDINEDIONE

This was prepared as above, using 14.4 g. (0.10 mole) of 3-amino-quinoline, 13.9 g. (0.105 mole) of ethyl α-hydroxy-iso-butyrate (and 37 ml. of diethyl carbonate). The catalyst lowered the reflux temperature from 136° to 101° C. and the theoretical amount of formed alcohol fraction was obtained. When cool, the product crystallized and was separated giving 24.6 g. (96%). Recrystallization (hexane-ethyl acetate) gave 71%, M.P. 164–166° C.

Analysis.—Calcd. for $C_{14}H_{12}N_2O_3$: C, 65.6; H, 4.7; N, 10.9. Found: C, 65.7; H, 4.9; N, 10.7.

The methiodide, prepared as in Example 1, was obtained in only 23% yield after 10 days at room temperature, M.P. 217–219° C. However, the yield was raised to 72% by refluxing the mother liquor with an additional 8 ml. of methyl iodide for 15 hours.

Analysis.—Calcd. for $C_{15}H_{15}IN_2O_3$: C, 45.3; H, 3.8; N, 7.0. Found: C, 45.8; H, 4.0; N, 7.0.

EXAMPLE 3.—3-(2,6-DIMETHYL-4-PYRIMIDYL)-1,3-OXAZOLIDINEDIONE

This was prepared following the procedure of Example 1, using 12.3 g. (0.10 mole) of 2,6-dimethyl-4-aminopyrimidine. The catalyst lowered the reflux temperature from 136° to 114° C. and 18 ml. of alcohol fraction (theory, 21.7) was obtained. Additional catalyst and refluxing was ineffective in promoting a quantitative formation of ethanol. The resulting solution was distilled at 30 mm. to remove the diethyl carbonate leaving 19.0 g. of residue which was dissolved in 250 ml. of ether, the ether solution filtered and the ether evaporated on the steam bath. The residue from the evaporated ether solution was dissolved in 200 ml. of hexane and allowed to crystallize at 20° C., and finally at 10° C. The solid (7.1 g.) was separated and recrystallized from 100 ml. of hexane. These crystals were recrystallized (hexane) to give 1.03 g. of product, M.P. 92.5–94° C.

Analysis.—Calcd. for $C_{11}H_{13}N_3O_3$: C, 56.2; H, 5.6; N, 17.9. Found: C, 56.2; H, 5.3; N, 17.8.

EXAMPLE 4.—3-(4-PICOLYL)-5,5-DIMETHYL-1,3-OXAZOLIDINEDIONE

This was prepared as above, using 10.8 g. (0.10 mole) of 4-picolylamine. The first quantity of catalyst proved ineffective, but a second portion lowered the reflux temperature as usual and the theoretical amount of ethanol fraction was obtained. The reaction mixture was filtered hot and the insoluble material (2.3 g.) was washed with 30 ml. of hot diethyl carbonate. The combined filtrate and wash was reheated and the product allowed to crystallize at 20° C. and then at 10° C. The solid was isolated with cold diethyl carbonate, 10.22 g., M.P. 93–94° C. Recrystallization from hexane-ethyl acetate gave 9.41 g., M.P. 93.5–94.5° C. The original mother liquor was stripped of diethyl carbonate at 30 mm. and the residue, 10.16 g., on recrystallization from hexane, gave an additional crop of 4.61 g. of product for a total yield of 64% of recrystallized product.

Analysis.—Calcd. for $C_{11}H_{12}N_2O_3$: C, 60.0; H, 5.5; N, 12.7. Found: C, 60.2; H, 5.6; N, 12.7.

EXAMPLE 5.—3-(2-PYRIDYL)-5-METHYL-1,3-OXAZOLIDINEDIONE

This was prepared as above using 9.4 g. (0.10 mole) of 2-aminopyridine, 17.7 g. (0.15 mole) of ethyl lactate and 37 ml. of diethyl carbonate. Addition of a solution of 0.1 g. of sodium metal in 2 ml. of ethanol lowered the reflux temperature from 138° to 112° C. On removal of formed ethanol, 17.5 ml. of ethanol was obtained (theory, 19.7). The reaction mixture was filtered, the diethyl carbonate removed at 30 mm. and the residue distilled in vacuo. The product, 11.84 g. (62%), was collected at 134° C. (0.2 mm.).

Analysis.—Calcd. for $C_9H_8N_2O_3$: C, 56.3; H, 4.2; N, 14.6. Found: C, 56.3; H, 4.4; N, 14.4.

The compounds of this invention are useful therapeutic agents with a relatively low order of toxicity and have been found to have anti-inflammatory activity and bronchodilator activity when evaluated by standard pharmacological tests.

The novel compounds of this invention can be combined with solid or liquid carriers and formulated into the form of tablets, powder packets or capsules, or, dissolved in suitable solvents for oral and parenteral administration for human or veterinary use.

It is to be understood that it is intended to cover all changes and modifications of the examples of the invention herein chosen for the purpose of illustration which do not constitute departures from the spirit and scope of the invention.

We claim:

1. A member of the group consisting of oxazolidine-2,4-dione free bases, the hydrochloric acid and methyl iodide salts thereof, having the following free base formula

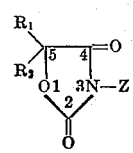

where $R_1$ and $R_2$ are members of the group consisting of hydrogen and methyl, and Z is a member of the group consisting of pyridyl, methyl substituted-pyridyl, picolyl, quinolyl, pyrimidyl and methyl substituted-pyrimidyl.

2. The free base of claim 1 wherein $R_1$ is methyl, $R_2$ is hydrogen and Z is (3-pyridyl).

3. The free base of claim 1 wherein $R_1$ and $R_2$ are methyl and Z is 4-methyl-(2-pyridyl).

4. The free base of claim 1 wherein $R_1$ and $R_2$ are methyl and Z is (3-quinolyl).

5. The free base of claim 1 wherein $R_1$ and $R_2$ are methyl and Z is (4-picolyl).

6. The free base of claim 1 wherein $R_1$ is methyl, $R_2$ is hydrogen and Z is (2-pyridyl).

References Cited in the file of this patent

UNITED STATES PATENTS 2,866,734    Shapiro _____ Dec. 30, 1958